(12) United States Patent
Liebman

(10) Patent No.: US 10,706,323 B1
(45) Date of Patent: Jul. 7, 2020

(54) PROCESSOR AND METHOD OF WEIGHTED FEATURE IMPORTANCE ESTIMATION

(71) Applicant: SparkCognition, Inc., Austin, TX (US)

(72) Inventor: Elad Liebman, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 16/559,998

(22) Filed: Sep. 4, 2019

(51) Int. Cl.
*G06N 20/00* (2019.01)
*G06K 9/62* (2006.01)

(52) U.S. Cl.
CPC ........... *G06K 9/623* (2013.01); *G06K 9/6218* (2013.01); *G06K 9/6272* (2013.01); *G06K 9/6277* (2013.01); *G06N 20/00* (2019.01)

(58) Field of Classification Search
None
See application file for complete search history.

(56) References Cited

U.S. PATENT DOCUMENTS

| 7,720,781 B2 * | 5/2010 | Forman | G06K 9/626 706/46 |
| 7,970,718 B2 * | 6/2011 | Guyon | G06K 9/6231 706/20 |
| 10,305,923 B2 * | 5/2019 | McLane | G06N 5/04 |
| 2018/0314939 A1 | 11/2018 | Skiles et al. | |
| 2018/0349388 A1 * | 12/2018 | Skiles | G06F 3/0482 |
| 2019/0007434 A1 * | 1/2019 | McLane | H04L 63/1425 |
| 2019/0188588 A1 * | 6/2019 | Yang | G06N 20/00 |

* cited by examiner

*Primary Examiner* — Paulinho E Smith
(74) *Attorney, Agent, or Firm* — Moore IP Law

(57) ABSTRACT

A method includes determining a feature importance ranking for each pair of clusters of a plurality of clusters to generate a first plurality of feature importance rankings. The method further includes determining a feature importance ranking between a particular data element and each cluster to generate a second plurality of feature importance rankings. A distance value associated with each pair of clusters of the plurality of clusters is determined to generate a plurality of distance values, and a probability value associated with each data element is determined to generate a plurality of probability values. The method further includes weighting the first plurality of feature importance rankings based on the plurality of distance values to determine a first plurality of weighted feature importance rankings and weighting the second plurality of feature importance rankings based on the plurality of probability values to determine a second plurality of weighted feature importance rankings.

20 Claims, 6 Drawing Sheets

PROCESSOR AND METHOD OF WEIGHTED FEATURE IMPORTANCE ESTIMATION

STATEMENT UNDER 35 U.S.C. § 202(c)(6)

This invention was made with government support under Department of Energy (DOE) S-number T-119202 awarded by the DOE. The government has certain rights in this invention.

BACKGROUND

Machine learning techniques include supervised learning and unsupervised learning. Supervised learning involves using labeled data to train a machine learning program (e.g., where the labeled data indicates the correct output), and unsupervised learning is performed without labeled data. In both supervised learning and unsupervised learning, machine learning programs are trained to perform operations, such as making predictions or decisions (e.g., to categorize data by assigning group association labels to the data).

Feature importance estimation can be used to understand operations performed by machine learning programs. For example, to understand why a machine learning program made a particular prediction or decision, features of input data can be analyzed (e.g., to reverse engineer why a particular element or sample of data was or was not classified a particular way). Feature importance estimation may also be used to improve existing models, such as by adjusting feature selection of the models.

Feature importance ranking may involve analyzing features associated with data and labels assigned to the data, such as by determining correlation (e.g., Pearson correlation or Spearman correlation) between features and labels associated with the data, measuring mutual information (or relative entropy) between features and labels associated with the data, or performing other techniques. To further illustrate, in some techniques, a local interpretable model-agnostic explanations (LIME) library or a Shapely additive explanation (SHAP) library can be used in connection with feature importance ranking. In some cases, these techniques may be ineffective or may produce poor results. For example, in unsupervised learning, no labels may be assigned to data.

As another example, in some cases, conventional approaches may provide "global" feature importance rankings that may fail to explain certain decisions made by a machine learning program. To illustrate, in some cases, data may include two data elements that are similar to one another (e.g., as measured within a feature space) but that are nonetheless assigned to different classifications by a machine learning program.

Conventional feature importance ranking techniques may explain why the two data elements are different from other data elements (e.g., by identifying common features between the data elements that are different from features of other data elements) but may fail to explain why data elements are classified differently by the machine learning program. For example, conventional feature importance ranking techniques may fail to explain why the two data elements are not assigned to the same cluster. Further, conventional feature importance estimation techniques may not adequately explain anomalous samples that are not associated with any label.

In some cases, conventional feature importance ranking techniques reduce efficiency of operation of an electronic device, such as by increasing power consumption by an electronic device. For example, electronic devices, communication networks, and other resources may be used to collect, transmit, store, and process irrelevant (or less relevant) data, such as data that is not used by a machine learning program to make a prediction or a decision. The collection, transmission, storage, and processing of irrelevant (or less relevant) data uses device power as well as resources that could otherwise be utilized to collect, transmit, store, and process more relevant data (e.g., data that is used by a machine learning program to make a prediction or a decision). In some cases, incorrect feature importance estimation may fail to explain behavior of the underlying models, such as the decision-making of autonomous vehicles.

SUMMARY

A processor is configured to perform a clustering operation to group elements of data into clusters that each share certain common attributes. Some elements of the data may be classified as anomalies (also referred to herein as outliers) that are not within any cluster.

After performing the clustering operation, the processor is configured to perform relative feature importance estimation (also referred to herein as weighted feature importance estimation) by weighting the neighboring environment (e.g., within a feature space) of a data element more than the farther environment of the data element. For example, the processor is configured to weight a first plurality of feature importance rankings associated with clustered data elements based on a plurality of distance values (e.g., distance within a feature space) to determine a first plurality of weighted feature importance rankings. As another example of performing the relative feature importance estimation, the processor is configured to weight a second plurality of feature importance rankings associated with anomalies of the data based on a plurality of probability values. The weighted feature performance rankings are used in machine learning operations.

By weighting feature importance rankings using localization data (e.g., distance values and probability values), the neighboring environment of a data element is weighted more than the farther environment of the data element. As a result, feature importance rankings weight local differences more (e.g., may be more "marginal") as compared to techniques that perform "global" feature importance rankings. For example, by emphasizing local environments, the feature importance rankings can indicate why two data elements that are near to one another in a feature space are nonetheless classified within different clusters. In this example, features that differentiate a particular data element from relatively close clusters in a feature space may be weighted more as compared to clusters that are farther away in the feature space.

In some implementations, weighted feature importance rankings are used to increase efficiency of operation of an electronic device or a system, such as by decreasing power consumption by an electronic device. For example, in response to determining that certain data elements (e.g., samples) of data are less relevant than other data elements for making a particular decision or prediction by a machine learning program, the machine learning program may perform or initiate one or more operations. In one example, the one or more operations include discarding (e.g., deleting) one or more data elements that fail to satisfy a relevancy threshold for a particular decision or prediction by the machine learning program. Alternatively or in addition, in another example, the one or more operations may include adjusting operation of a sensor associated with one or more data elements that fail to satisfy the relevancy threshold, such as by decreasing a duty cycle of the sensor or by deactivating the sensor. As a result, resource utilization is improved.

DETAILED DESCRIPTION

Particular aspects of the disclosure are described further below with reference to the drawings. In the description, common features are designated by common reference numbers. Various terminology is used for the purpose of describing particular implementations only and is not intended to be limiting of implementations. For example, the singular forms "a," "an," and "the" are intended to include the plural forms as well, unless the context clearly indicates otherwise. The terms "comprises" and "comprising" are used interchangeably with "includes" or "including." Additionally, the term "wherein" is used interchangeably with "where." As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

Further, terms such as "determining", "calculating", "shifting", "adjusting", etc. can be used to describe how one or more operations are performed. It should be noted that such terms are not to be construed as limiting and other techniques can be utilized to perform similar operations. Additionally, as referred to herein, "generating", "calculating", "using", "selecting", "accessing", and "determining" can be used interchangeably. For example, "generating", "calculating", or "determining" a parameter (or a signal) can refer to actively generating, calculating, or determining the parameter (or the signal) or to using, selecting, or accessing the parameter (or signal) that is already generated, such as by another component or device.

Figure 1A:
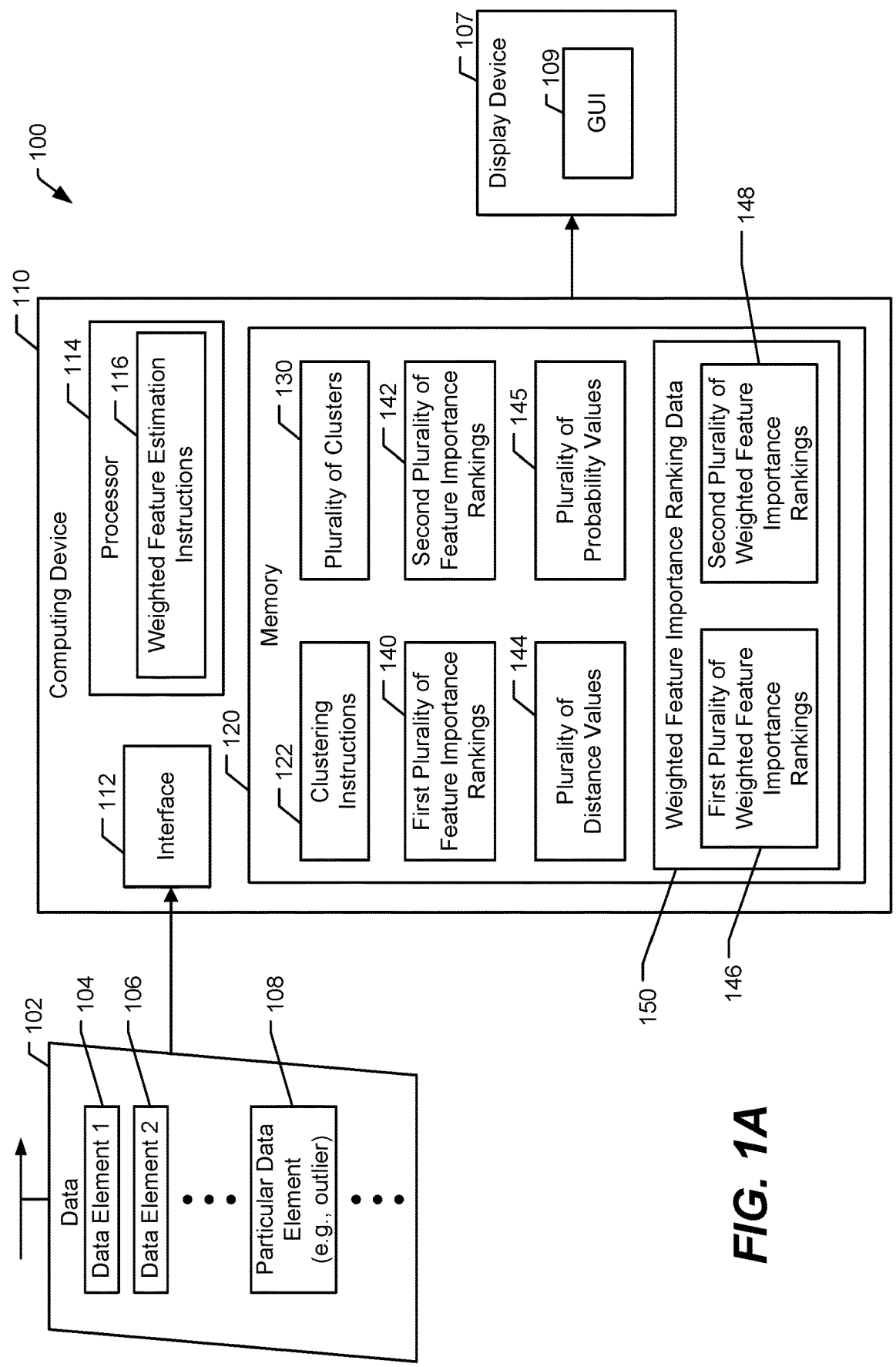
FIG. 1A illustrates a particular example of a system that includes a computing device configured to perform weighted feature estimation based on data to generate feature importance ranking data.

Referring to FIG. 1A, a particular illustrative example of a system is depicted and generally designated 100. The system 100 includes one or more computing devices, such as laptop computers, desktop computers, mobile devices, servers, Internet of Things (IoT) devices, or other devices, as illustrative examples.

In the example of FIG. 1A, the system 100 includes a computing device 110. In some implementations, the computing device 110 is coupled to a display device 107.

The computing device 110 includes a processor 114 and a memory 120 that is coupled to the processor 114. In some implementations, the computing device 110 includes an interface 112, such as a communications interface configured to receive data 102 from one or more devices via a communications network. In some implementations, the computing device 110 is configured to present a graphical user interface (GUI) 109 via the display device 107.

During operation, the computing device 110 may receive the data 102 from one or more devices. To illustrate, in some examples, the data 102 includes samples or measurements generated by one or more sensors, such as IoT sensors. Alternatively or in addition, the data 102 may include other data, such as medical data, data input to one or more computing devices (e.g., survey data collected via the Internet, as a non-limiting example), one or more other types of data, or a combination thereof.

To further illustrate, in the example of FIG. 1A, the data 102 includes a plurality of data elements, such as a first data element 104, a second data element 106, and a particular data element 108. In some examples, each data element of the data 102 corresponds to a sample or a measurement. Each data element of the data 102 is associated with one or more features. In one illustrative example, the data 102 represents an image, and data elements of the data 102 correspond to pixel values of the image.

The computing device 110 is configured to determine a plurality of clusters 130 based on the data 102. Each cluster of the plurality of clusters 130 includes a corresponding subset of data elements of the data 102 having one or more similar features. In a non-limiting example, the data 102 represents an image, and each cluster of the plurality of clusters 130 includes data elements of the data 102 having one or more similar attributes, such as a similar color.

To further illustrate, the processor 114 may be configured to execute clustering instructions 122 to determine the plurality of clusters 130 based on the data 102. The clustering instructions 122 may be executable to perform one or more types of clustering operations, including centroid clustering operations (such as K-Means clustering), hierarchical clustering operations, mean-shift clustering operations, connectivity clustering operations, density clustering operations (such as density-based spatial clustering applications with noise (DBSCAN)), distribution clustering operations, expectation-maximization (EM) clustering using Gaussian mixture models (GMM), other types of clustering operations, or a combination thereof.

In some cases, during a clustering operation, the processor 114 may detect one or more anomalous data elements (also referred to herein as outliers), such as the particular data element 108. As used herein, an anomalous data element (or outlier) may refer to a data element that is not assigned to any cluster associated with data. As an example, in FIG. 1A, the processor 114 is configured to detect the particular data element 108 of the data 102 and to classify the particular data element 108 as an outlier that is not associated with a cluster of the plurality of clusters 130.

Figure 1B:
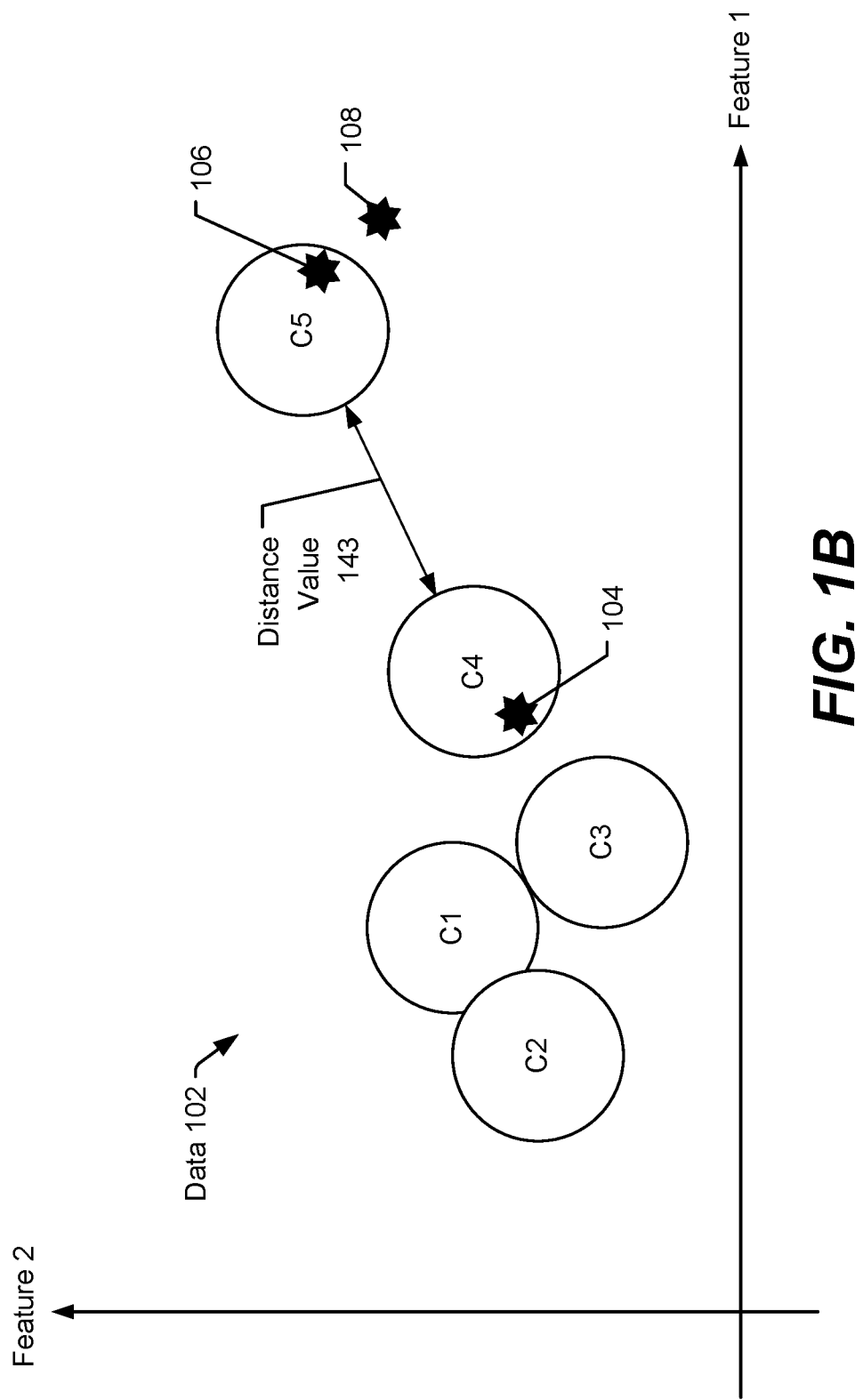
FIG. 1B illustrates a particular example of clusters associated with the data of FIG. 1A.

To further illustrate, FIG. 1B depicts certain aspects of an example of the data 102 in a feature space. In some examples, the feature space has a number of dimensions corresponding to a number of different features associated with the data 102. In the example of FIG. 1B, the feature space includes two dimensions indicated by the abscissa (feature 1) and the ordinate (feature 2). In a non-limiting example, feature 1 corresponds to a first property (e.g., size of pixel values) of data elements of an image represented by the data 102, and feature 2 corresponds to a second property (e.g., color of pixel values) of data elements of the image.

In FIG. 1B, certain data elements of the data 102 are grouped into clusters C1, C2, C3, C4, and C5. In one example, the clusters C1, C2, C3, C4, and C5 correspond to the plurality of clusters 130 of FIG. 1A. In the illustrative example of FIG. 1B, the first data element 104 is classified within the cluster C4, and the second data element 106 is classified within the cluster C5. Further, in the example of FIG. 1B, the clusters C1, C2, C3, C4, and C5 are illustrated as spherical clusters (e.g., groups of features that approximately correspond to a circle or a sphere). In other examples, one or more of the clusters C1, C2, C3, C4, and C5 may have a different shape. In addition, it is noted that in some examples, certain clusters of the plurality of clusters 130 may overlap (e.g., where a data element of the data 102 is classified within multiple clusters of the plurality of clusters 130). In other examples, the clusters of the plurality of clusters 130 may be non-overlapping (e.g., where each data element of the data is classified within a single cluster of the plurality of clusters 130).

The example of FIG. 1B also depicts that the particular data element 108 is classified as an outlier that is not included in any of the clusters C1, C2, C3, C4, and C5. To further illustrate, in some examples, the plurality of clusters 130 is associated with a plurality of sets of features of the data, and the particular data element 108 is associated with a particular set of features that is distinct from each of the plurality of sets of features.

Referring again to FIG. 1A, the processor 114 is configured to determine a feature importance ranking for each pair of clusters of the plurality of clusters 130 to generate a first plurality of feature importance rankings 140. In a particular example, the plurality of clusters 130 includes k clusters, and the first plurality of feature importance rankings 140 includes (k/2) feature importance rankings, where k is a positive integer greater than one. As a particular example, FIG. 1B illustrates five clusters of the plurality of clusters 130. In this example, the first plurality of feature importance rankings 140 may include ten feature importance rankings (e.g., a first importance ranking between the clusters C1 and C2, a second importance ranking between the clusters C1 and C3, etc.).

The processor 114 is configured to determine a feature importance ranking between the particular data element 108 and each cluster of the plurality of clusters 130 to generate a second plurality of feature importance rankings 142. For example, the second plurality of feature importance rankings 142 may include a first feature importance ranking between the particular data element 108 and the cluster C1, a second feature importance ranking between the particular data element 108 and the cluster C2, etc. In a particular example, the second plurality of feature importance rankings 142 includes k feature importance rankings. In some examples, the second plurality of feature importance rankings 142 indicates a ranking of features of the particular data element 108 contributing to classification of the particular data element 108 as an outlier.

To illustrate, in some examples, the data 102 includes sensor measurements generated by a plurality of sensors of a device, such as sensors of a wind turbine. In a particular example, the processor 114 is configured to execute the clustering instructions 122 to partition the sensor measurements into clusters A, B, C and D. In one example, the clusters A and B are relatively close to one another in a feature space and represent characteristics of spring and summer, respectively, and the clusters C and D are close to one another in the feature space and represent characteristics of fall and winter, respectively. If the wind turbine is located in a climate where winter is longer than the other seasons, the first plurality of feature importance rankings 140 may indicate how sensor measurements generated in summer differ from sensor measurements generated in the spring (e.g., instead of only indicating how sensor measurements generated in spring and summer differ from sensor measurements generated in winter). A global feature importance ranking as used in some conventional techniques may be dominated by overall differences between winter and the other seasons.

Similarly, the second plurality of feature importance rankings 142 may differentiate certain anomalous sample measurements (e.g., outliers) from similar sample measurements that are close to the anomalous sample measurements in the feature space (e.g., instead of differentiating the anomalous sample measurements from less similar sample measurements). To illustrate, certain days in summer may have anomalous characteristics. A global anomaly ranking as used in some conventional techniques may explain an anomalous day in summer as being due to the day not falling in winter, which may be unhelpful and even misleading. In accordance with an aspect of the disclosure, the second plurality of feature importance rankings 142 include information indicating which features make the anomalous day unlike a typical day in summer (e.g., instead of differentiating the anomalous day from a typical winter day).

The processor 114 is configured to determine the first plurality of feature importance rankings 140 and the second plurality of feature importance rankings 142 using one or more techniques that can be selected based on the particular implementation. For example, in some implementations, the processor 114 is configured to determine one or more of the first plurality of feature importance rankings 140 and the second plurality of feature importance rankings 142 using a random forest classification technique. As another example, in some implementations, the processor 114 is configured to determine the first plurality of feature importance rankings 140 and the second plurality of feature importance rankings 142 using a mutual information classification technique.

The processor 114 is configured to determine a distance value associated with each pair of clusters of the plurality of clusters 130 to generate a plurality of distance values 144. For example, the plurality of distance values 144 may include a first distance value indicating a first distance (e.g., within a feature space, such as the feature space described with reference to FIG. 1B) between the cluster C1 and the cluster C2, a second distance (e.g., within the feature space) between the cluster C1 and the cluster C3, etc. To further illustrate, FIG. 1B illustrates a distance value 143 of the plurality of distance values 144 indicating distance between the cluster C4 and the cluster C5 within the feature space of FIG. 1B. In a particular example, the plurality of distance values 144 includes k distance values. As used herein, a distance within a feature space may refer to a degree of difference between items (e.g., clusters or data elements) as specified by coordinates of the items within the feature space.

The processor 114 is configured to determine, for each data element of the data 102 that is within one or more clusters of the plurality of clusters 130, a probability value associated with the data element to generate a plurality of probability values 145. As an example, the plurality of probability values 145 may include a first probability value indicating a confidence that the first data element 104 should be classified within the cluster C4 (e.g., instead of classifying the first data element 104 within another cluster, such as the cluster C3). As another example, the plurality of probability values 145 may include a second probability value indicating a confidence that the second data element 106 should be classified within the cluster C5 (e.g., instead of classifying the first data element 104 within another cluster, such as the cluster C4).

The processor 114 is configured to determine weighted feature importance ranking data 150 associated with the data 102. The weighted feature importance ranking data 150 is based on the first plurality of feature importance rankings 140, the plurality of distance values 144, the second plurality of feature importance rankings 142, and the plurality of probability values 145. In some examples, the weighted feature importance ranking data 150 indicates, for one or more data elements of the data 102, rankings of features that contribute to classification of the one or more data elements as being within corresponding clusters of the plurality of clusters 130. Alternatively or in addition, the weighted feature importance ranking data 150 may indicate, for one or more data elements of the data 102, rankings of features that contribute to classification of the one or more data elements as being outliers of the data 102. To illustrate, as a particular example, the weighted feature importance ranking data 150 may indicate a ranking of features contributing to classification of the first data element 104 as being within the cluster C4 instead of being classified within one or more other clusters, such as the cluster C3. As another example, the weighted feature importance ranking data 150 may indicate a ranking of features contributing to classification of the first data element 104 as being within the cluster C4 instead of being classified within one or more other clusters, such as the cluster C3. As an additional example, the weighted feature importance ranking data 150 may indicate a ranking of features contributing to classification of the particular data element 108 as being an outlier that is not classified within any cluster of the plurality of clusters 130 (e.g., instead of being classified within the cluster C5, as an illustrative example).

In FIG. 1A, the weighted feature importance ranking data 150 indicates a first plurality of weighted feature importance rankings 146. The processor 114 is configured to determine the first plurality of weighted feature importance rankings 146 based on the first plurality of feature importance rankings 140 and further based on the plurality of distance values 144. In some implementations, the first plurality of weighted feature importance rankings 146 includes a feature importance ranking for each cluster i of the plurality of clusters 130 weighted by the corresponding distance of the plurality of distance values 144 associated with the cluster i (where i is a positive integer index associated with a cluster of the plurality of clusters 130). In a particular example, the processor 114 is configured to determine the first plurality of weighted feature importance rankings 146 in accordance with Equation 1:

$$f_i(C_i) = \Sigma_{\{i \neq j\}} f_i(C_i, C_j) \cdot d(C_i, C_j) \qquad \text{(Equation 1).}$$

In Equation 1, j is a positive integer index associated with a cluster of the plurality of clusters 130 other than the cluster i, $d(C_i, C_j)$ indicates a distance value of the plurality of distance values 144 from cluster i to cluster j, and $f_i$ indicates the feature importance ranking of the first plurality of feature importance rankings 140 between the cluster i and the cluster j.

The example of FIG. 1A also illustrates that the weighted feature importance ranking data 150 indicates a second plurality of weighted feature importance rankings 148. The processor 114 is configured to determine the second plurality of weighted feature importance rankings 148 based on the second plurality of feature importance rankings 142 and further based on the plurality of probability values 145 (e.g., by weighting the second plurality of feature importance rankings 142 based on the plurality of probability values 145). In some implementations, the second plurality of weighted feature importance rankings 148 include a feature importance ranking for each anomaly of the data 102 (such as the particular data element 108) weighted by the probability of the plurality of probability values 145 corresponding to the anomaly. In a particular example, the processor 114 is configured to determine the second plurality of weighted feature importance rankings 148 in accordance with Equation 2:

$$f^{anom}(s) = \Sigma_i f_i^{anom}(C_i, \text{anomalies}) \cdot C_{all}(s, C_i) \qquad \text{(Equation 2).}$$

In Equation 2, Carr indicates a probability value of the plurality of probability values 145 associated with one or more anomalies ("anomalies" in Equation 2) of the data 102 (such as the particular data element 108), $f_i^{anom}$ indicates a feature importance ranking of the second plurality of feature importance rankings 142.

The weighted feature importance ranking data 150 indicates, for each data element of the data 102, a list of features contributing to classification of the data element as being within (or outside) one or more clusters of the plurality of clusters 130, where each feature of the list of features is weighted based on a degree that the feature differentiates the data element from a neighboring cluster of the plurality of clusters 130. For example, the first plurality of weighted feature importance rankings 146 may indicate a first list of features contributing to classification of the first data element 104 as being within the cluster C4, where each feature of the first list of features is weighted based on a degree that the feature differentiates the first data element 104 from a neighboring cluster of the plurality of clusters 130, such as the cluster C3. As another example, the first plurality of weighted feature importance rankings 146 may indicate a second list of features contributing to classification of the second data element 106 as being within the cluster C5, where each feature of the second list of features is weighted based on a degree that the feature differentiates the second data element 106 from a neighboring cluster of the plurality of clusters 130, such as the cluster C4. As an additional example, the second plurality of weighted feature importance rankings 148 may indicate a third list of features contributing to classification of the particular data element 108 as being classified as an outlier, where each feature of the third list of features is weighted based on a degree that the feature differentiates the particular data element 108 from a neighboring cluster of the plurality of clusters 130, such as the cluster C5.

In some examples, the processor 114 is configured to execute weighted feature estimation instructions 116 to generate the weighted feature importance ranking data 150. In some implementations, the weighted feature estimation instructions 116 are executable by the processor 114 to perform one or more operations described herein, such as one or more operations described with reference to Equation 1, one or more operations described with reference to Equation 2, one or more other operations, or a combination thereof. For example, in some implementations, the weighted feature estimation instructions 116 include one or more of an add instruction, a multiply instruction, one or more other instructions, or a combination thereof.

To further illustrate, the first plurality of weighted feature importance rankings 140 may indicate aggregate pairwise information of the feature importance rankings 140, 142 per cluster (e.g., a single, unified feature importance ranking per cluster). In a particular example, the data 102 includes sensor measurements from a wind turbine, and the first plurality of weighted feature importance rankings 146 gives more emphasis to features differentiating how summer is different from spring, for instance, than the more trivial information on how summer is different from winter. Similarly, the second plurality of weighted feature importance rankings 148 may indicate aggregate information per anomaly (e.g., rather than looking at each anomaly and considering how it differs from each season individually). As a result, the second plurality of weighted feature importance rankings 148 enables aggregation of information that emphasizes how an anomaly is differentiated from the most relevant seasons.

In some examples, the computing device 110 is configured to output the weighted feature importance ranking data 150 (or other data related to the weighted feature importance ranking data 150). To illustrate, in one example, the computing device 110 is configured to output (e.g., to the display device 107) data representing a graphical representation of one or more aspects of the weighted feature importance ranking data 150. In a particular example, the display device 107 is configured to generate the graphical representation using the GUI 109. Certain examples of graphical representations of aspects of the weighted feature importance ranking data 150 are described further with reference to FIGS. 2A-2C.

Alternatively or in addition, the computing device 110 may be configured to provide the weighted feature importance ranking data 150 to another device, such as by sending the weighted feature importance ranking data 150 to one or more other devices (e.g., a server) using the interface 112.

Alternatively or in addition, in a particular example, the processor 114 (or another device, such as a server) is configured to use the weighted feature importance ranking data 150 in a machine learning operation. To illustrate, the processor 114 may be configured to execute the machine learning program to "learn," based on the weighted feature importance ranking data 150, which samples of the data 102 are relevant to a particular decision or prediction. As an example, the processor 114 may execute the machine learning program to make decisions or predictions regarding sensors of a wind turbine, such as by determining when to activate (or deactivate) one or more of the sensors.

In some examples, the processor 114 is configured to execute the machine learning program to adjust a control system based on the weighted feature importance ranking data 150. In one illustrative example, a plurality of sensors generates the data 102, and the processor 114 is configured to execute the machine learning program to adjust operation of the plurality of sensors based on the weighted feature importance ranking data 150. To illustrate, a particular sensor of the plurality of sensors may be adjusted (e.g., by decreasing a duty cycle of the sensor or by deactivating the sensor) in connection with the machine learning operation based on the weighted feature importance ranking data 150 indicating that a feature associated with a sample generated by the sensor is of less relative importance than one or more features associated with other samples of the data 102. Alternatively or in addition, a particular sensor of the plurality of sensors may be adjusted (e.g., by increasing a duty cycle of the sensor or by activating the sensor) in connection with the machine learning operation based on the weighted feature importance ranking data 150 indicating that a feature associated with a sample generated by the sensor is of more relative importance than one or more features associated with other samples of the data 102.

In some implementations, the processor 114 is configured to execute the machine learning program to compare one or more weighted features indicated by the weighted feature importance ranking data 150 to a relevancy threshold that is associated with a particular decision or prediction made by the machine learning program executed by the computing device 110 (or by another computing device). As an example, in response to determining that weighted features associated with a data element of the data 102 fail to satisfy the relevancy threshold, the processor 114 may be configured to execute the machine learning program to discard (e.g., delete) the data element from the memory 120. Alternatively or in addition, in another example, in response to determining that weighted features associated with a data element of the data 102 fail to satisfy the relevancy threshold, the processor 114 may be configured to execute the machine learning program to decrease a duty cycle of a sensor generating the data element or may deactivate the sensor. As a result, resource utilization is improved.

One or more aspects of FIGS. 1A and 1B improve feature estimation in some cases. To illustrate, in certain conventional feature importance techniques, a "global" feature importance is performed to identify that the particular data element 108 is more similar to the second data element 106 than to the first data element 104. Such techniques may emphasize features of the particular data element 108 that cause the particular data element 108 to be excluded from the clusters C1, C2, C3, and C4. Such conventional techniques may fail to explain why the particular data element 108 is not assigned to the cluster C5 (e.g., why the particular data element 108 is an outlier). By weighting the local environment of the particular data element 108 (e.g., the cluster C5) more than another environment of the particular data element 108 (e.g., the clusters C1, C2, C3, and C4) in accordance with some aspects of the disclosure, features of the particular data element 108 that contribute to classification of the particular data element 108 as an outlier can be identified.

Figure 2A:
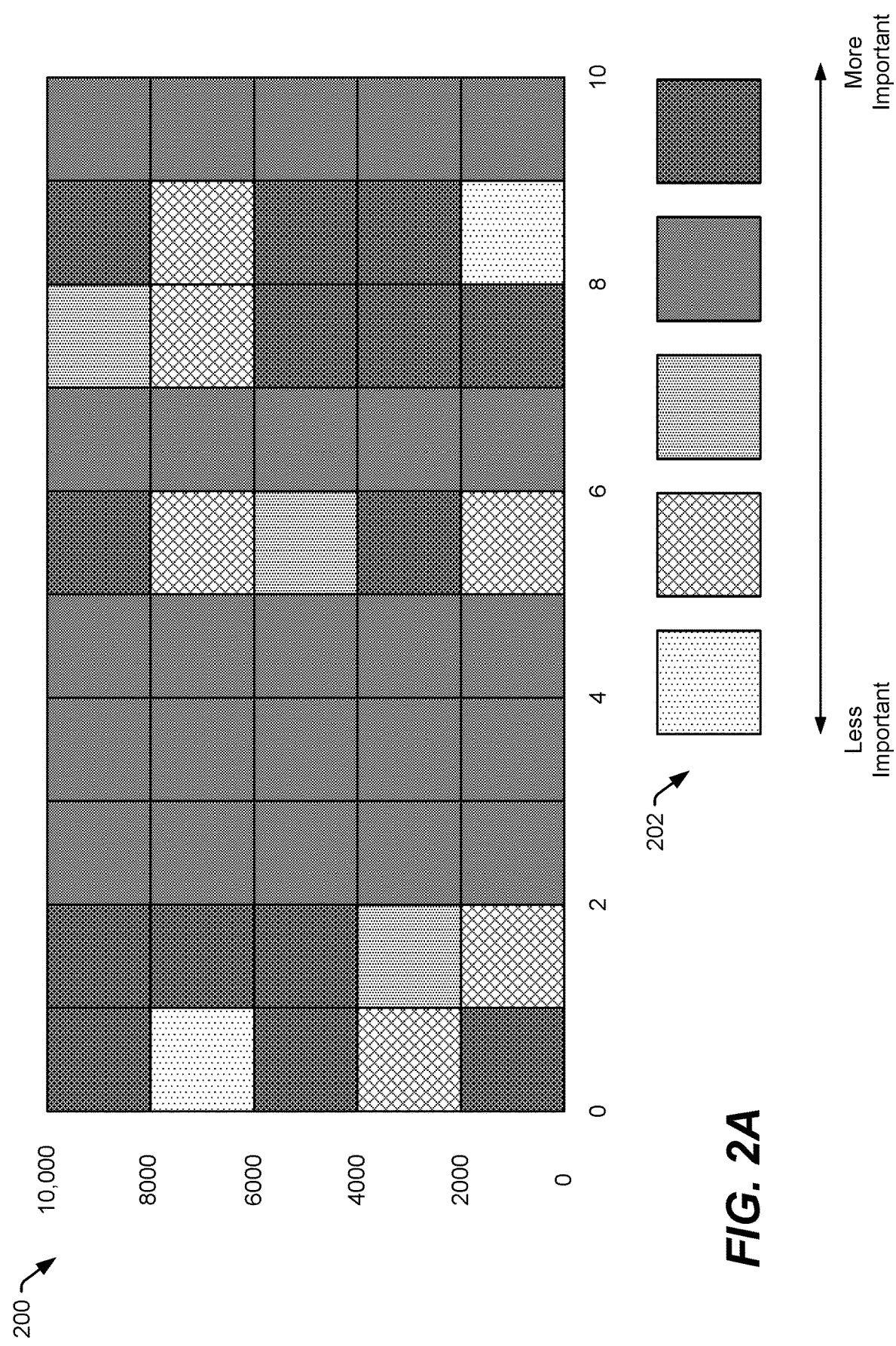
FIG. 2A illustrates a graph depicting certain aspects of the feature importance ranking data of FIG. 1A.

FIG. 2A depicts a graph 200 (e.g., a heat map) illustrating certain aspects associated with a particular example of the weighted feature importance ranking data 150. In FIG. 2A, the abscissa corresponds to features indicated by the weighted feature importance ranking data 150, and the ordinate corresponds to data elements of the data 102. In the particular example of FIG. 2A, the graph 200 indicates 10 features and 10,000 data elements. In other examples, the graph 200 can indicate a different number of features, a different number of data elements, or both.

FIG. 2A illustrates that the processor 114 may execute the weighted feature estimation instructions 116 to determine one or more features contributing to particular classifications of data elements of the data 102. For example, in FIG. 2A, a legend 202 shows that, for each data element, certain features may be ranked more or less important to classification of the data element as being within a particular cluster (or no cluster, as in the case of an anomaly). In some examples, the graph 200 corresponds to an example in which five spherical clusters (e.g., the clusters C1, C2, C3, C4, and C5) are identified based on samples from Gaussian distributions with multiple feature dimensions (e.g., 10-20 dimensional multivariate Gaussian distributions).

Figure 2B:
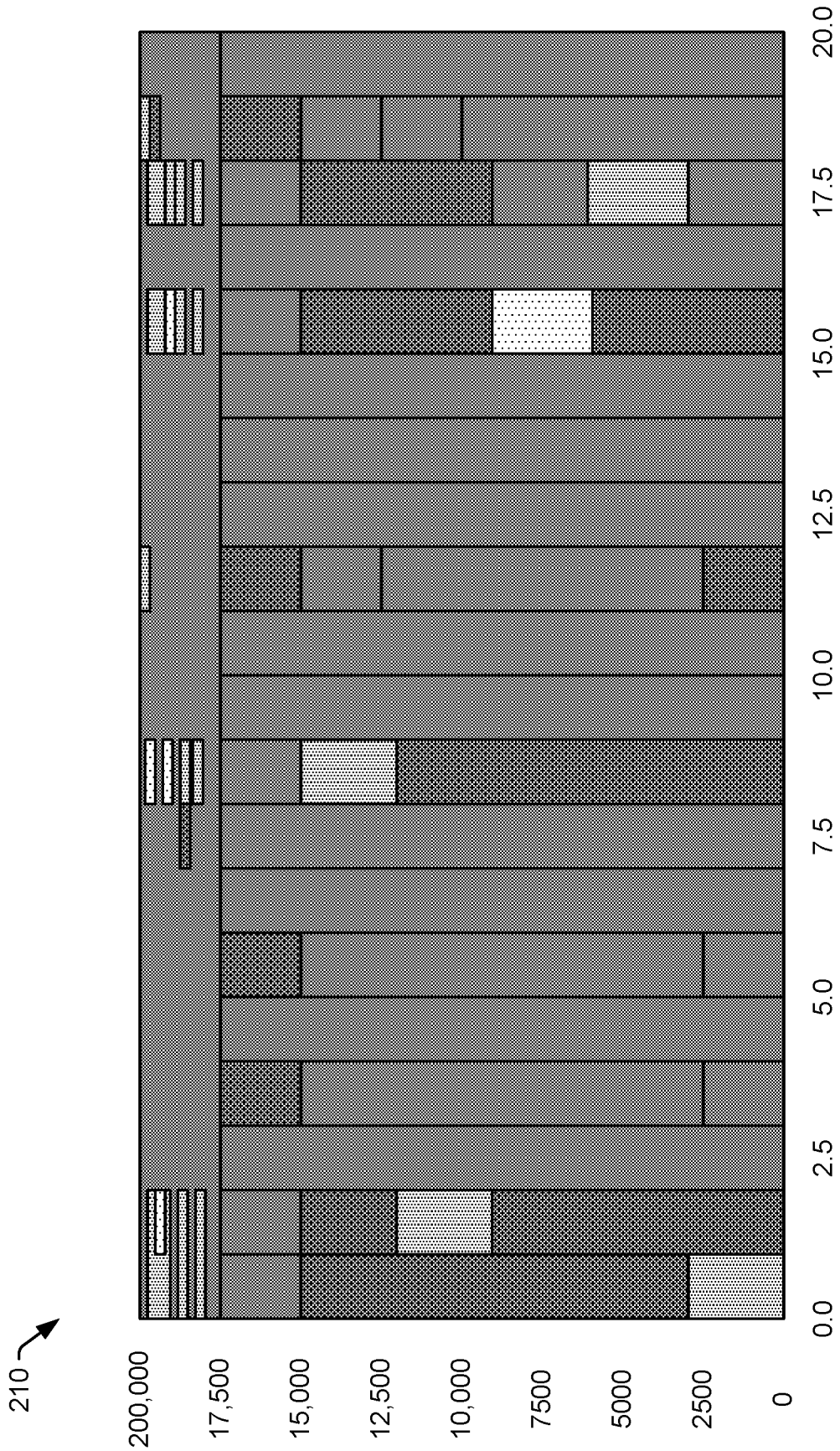
FIG. 2B illustrates another graph depicting certain aspects of the feature importance ranking data of FIG. 1A.

FIG. 2B depicts a graph 210. In some examples, the graph 210 of FIG. 2B corresponds to an example having the five clusters of the graph 200 plus a sixth cluster from a multivariate Gaussian distribution that is offset from the other five multivariate Gaussian distributions by a relatively large factor in multiple features. In FIG. 2B, anomalies are depicted at the top of the graph 210 and are ranked internally by closest cluster (thus reflecting the same ordering of clusters as in the non-anomalous samples of the graph 210).

Figure 2C:
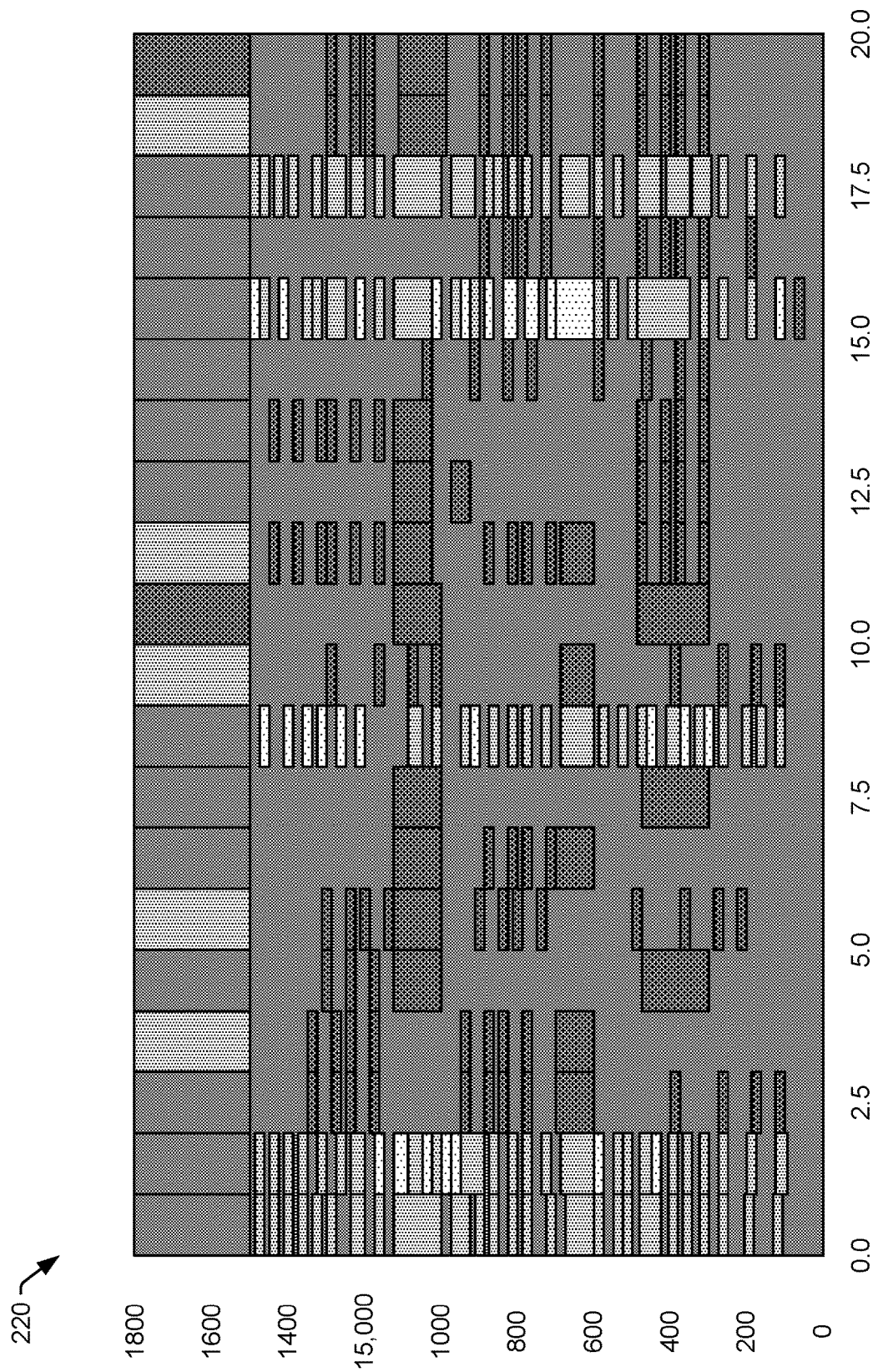
FIG. 2C illustrates another graph depicting certain aspects of the feature importance ranking data of FIG. 1A.

FIG. 2C depicts a graph 220. In FIG. 2C, only anomalies are shown. In FIG. 2C, the anomalies are ranked internally by closest cluster (thus reflecting the same ordering of clusters as in non-anomalous samples).

Figure 3:
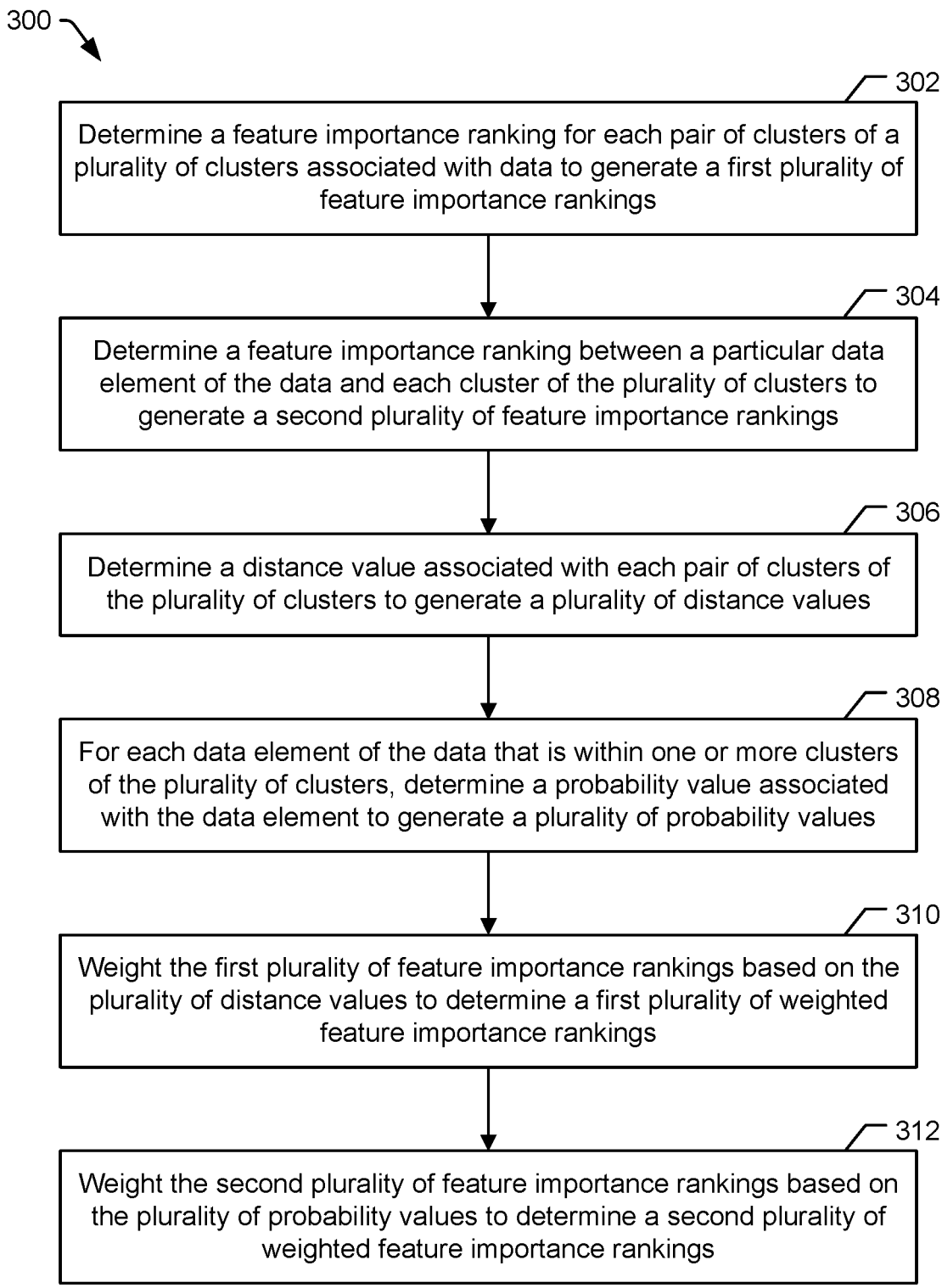
FIG. 3 is a flowchart to illustrate a particular embodiment of a method of operation of a processor, such as a processor included in the computing device of FIG. 1A.

Referring to FIG. 3, a particular illustrative example of a method of operation of a processor is depicted and generally designated 300. In a particular example, operations of the method 300 are performed by the processor 114 of FIG. 1A.

The method 300 includes determining a feature importance ranking for each pair of clusters of a plurality of clusters associated with data to generate a first plurality of feature importance rankings, at 302. To illustrate, in some examples, the processor 114 is configured to determine a feature importance ranking for each pair of clusters of the plurality of clusters 130 associated with the data 102 to generate the first plurality of feature importance rankings 140.

In some implementations, generating the first plurality of feature importance rankings 140 includes, for a pair of clusters including a first cluster of the plurality of clusters 130 and a second cluster of the plurality of clusters, 130, identifying at least a first feature associated with classification of data elements of the data 102 as being within the first cluster instead of the second cluster and further includes identifying at least a second feature associated with classification of data elements of the data 102 as being within the second cluster instead of the first cluster. To illustrate, in one example, the first cluster corresponds to the cluster C4, and the second cluster corresponds to the cluster C5. The processor 114 may be configured to determine at least one feature associated with classification of data elements (e.g., the first data element 104) as being within the cluster C4, such as by determining one or more features that contribute to classification of the first data element 104 as being within the cluster C4 instead of another cluster (e.g., the cluster C3) or instead of being classified as an outlier. The processor 114 may be configured to determine at least one feature associated with classification of data elements (e.g., the second data element 106) as being within the cluster C5, such as by determining one or more features that contribute to classification of the second data element 106 as being within the cluster C5 instead of another cluster (e.g., the cluster C4) or instead of being classified as an outlier.

The method 300 further includes determining a feature importance ranking between a particular data element of the data and each cluster of the plurality of clusters to generate a second plurality of feature importance rankings, at 304. To illustrate, the processor 114 may be configured to determine a feature importance ranking between the particular data element 108 and each cluster of the plurality of clusters 130 to generate the second plurality of feature importance rankings 142. In one example, the second plurality of feature importance rankings 142 includes a first feature importance ranking between the particular data element 108 and the cluster C1, a second feature importance ranking between the particular data element 108 and the cluster C2, a third feature importance ranking between the particular data element 108 and the cluster C3, a fourth feature importance ranking between the particular data element 108 and the cluster C4, and a fifth feature importance ranking between the particular data element 108 and the cluster C5.

In some examples, generating the second plurality of feature importance rankings 142 includes identifying, for each cluster of the plurality of clusters 130, a feature associated with classification of data elements of the data 102 as being outside each cluster. For example, the processor 114 may be configured to identify a feature of the particular data element 108 contributing to classification of the particular data element 108 as being outside the cluster C5. As additional examples, the processor 114 may be configured to identify one or more features of the particular data element 108 contributing to classification of the particular data element 108 as being outside the clusters C1, C2, C3, and C4.

In some implementations, the first plurality of feature importance rankings 140 and the second plurality of feature importance rankings 142 are determined using a random forest classification technique. In another example, the first plurality of feature importance rankings 140 and the second plurality of feature importance rankings 142 are determined using a mutual information classification technique. In other examples, the first plurality of feature importance rankings 140 and the second plurality of feature importance rankings 142 can be determined using one or more other techniques.

The method 300 further includes determining a distance value associated with each pair of clusters of the plurality of clusters to generate a plurality of distance values, at 306. In some examples, the processor 114 is configured to determine, for each pair of clusters of the plurality of clusters 130, a probability value associated with the pair of clusters to generate the plurality of distance values 144. To further illustrate, in some implementations, generating the plurality of distance values 144 includes determining a distance value, within a feature space, between a first cluster of the plurality of clusters 130 and a second cluster of the plurality of clusters 130. In one illustrative example, the first cluster corresponds to the cluster C4, the second cluster corresponds to the cluster C5, and the distance value corresponds to the distance value 143.

The method 300 further includes determining, for each data element of the data that is within one or more clusters of the plurality of clusters, a probability value associated with the data element to generate a plurality of probability values, at 308. In some examples, the processor 114 is configured to determine, for each data element of the data 102 that is within one or more clusters of the plurality of clusters 130, a probability value associated with the data element to generate the plurality of probability values 145.

To further illustrate, in some examples, generating the plurality of probability values 145 includes determining, for each cluster of the plurality of clusters 130, a probability that each non-anomalous data element of the data is within the cluster. As a particular example, the plurality of probability values 145 may indicate a probability that the first data element 104 is within the cluster C1, a probability that the first data element 104 is within the cluster C2, a probability that the first data element 104 is within the cluster C3, a probability that the first data element 104 is within the cluster C4, and a probability that the first data element 104 is within the cluster C5. In the example depicted in FIG. 1B, the probability associated with the first data element 104 being within the cluster C4 may be greater than the other probabilities associated with the first data element 104. As another example, the plurality of probability values 145 may indicate a probability that the second data element 106 is within the cluster C1, a probability that the second data element 106 is within the cluster C2, a probability that the second data element 106 is within the cluster C3, a probability that the second data element 106 is within the cluster C4, and a probability that the second data element 106 is within the cluster C5. In the example depicted in FIG. 1B, the probability associated with the second data element 106 being within the cluster C5 may be greater than the other probabilities associated with the second data element 106.

The method 300 further includes weighting the first plurality of feature importance rankings based on the plurality of distance values to determine a first plurality of weighted feature importance rankings, at 310. In some implementations, the processor 114 is configured to weight the first plurality of feature importance rankings 140 based on the plurality of distance values 144 to determine the first plurality of weighted feature importance rankings 146. To further illustrate, in some examples, determining the first plurality of weighted feature importance rankings 146 includes identifying a primary feature associated with a clustered data element of the data contributing to classification of the clustered data element within a cluster associated with the clustered data element. As an example, the primary feature may correspond to a feature of the first data element 104 contributing to classification of the first data element 104 within the cluster C4. As another example, the primary feature may correspond to a feature of the second data element 106 contributing to classification of the second data element 106 within the cluster C5.

The method 300 further includes weighting the second plurality of feature importance rankings based on the plurality of probability values to determine a second plurality of weighted feature importance rankings, at 312. In some examples, the processor 114 is configured to weight the second plurality of feature importance rankings 148 based on the plurality of probability values 145 to determine the second plurality of weighted feature importance rankings 148.

To further illustrate, in some examples, determining the second plurality of weighted feature importance rankings 148 includes identifying a primary feature associated with the particular data element 108 contributing to classification of the particular data element 108 as being outside a particular cluster that is proximate to the particular data element in a feature space. In the example of FIG. 1B, the particular cluster corresponds to the cluster C5 (since the cluster C5 is nearer to the particular data element 108 in the feature space of FIG. 2 as compared to the clusters C1, C2, C3, and C4). In some examples, the second plurality of weighted feature importance rankings 148 indicates a weighted ranking of features of the particular data element 108 contributing to classification of the particular data element 108 as an outlier.

In some implementations, the method 300 further includes, prior to determining the first plurality of feature importance rankings, classifying one or more data elements of the data as being within one or more clusters of the plurality of clusters and classifying the particular data element as being an outlier of the data. As a particular example, the processor 114 may be configured to execute the clustering instructions 122 to classify each data element of the data 102 as being within (or outside) one or more clusters of the plurality of clusters 130. In one example, the processor 114 may be configured to execute the clustering instructions 122 to classify the first data element 104 as within the cluster C4, to classify the second data element 106 as within the cluster C5, and to classify the particular data element 108 as an outlier of the data 102. In some implementations, the plurality of clusters 130 is associated with a plurality of sets of features of the data 102, and the particular data element 108 is associated with a particular set of features that is distinct from each of the plurality of sets of features.

Aspects of the method 300 can be performed using a supervised learning process or an unsupervised learning process. In one example, the first plurality of feature importance rankings 140 and the second plurality of feature importance rankings 142 are generated during an unsupervised learning process performed by the processor 114. In another example, the first plurality of feature importance rankings 140 and the second plurality of feature importance rankings 142 are generated during a supervised learning process performed by the processor 114.

In some implementations, the method 300 further includes comparing one or more weighted features indicated by the weighted feature importance ranking data 150 to a relevancy threshold that is associated with a particular decision or prediction made by a machine learning program executed by a computing device. The method 300 may further include initiating or performing one or more operations based on the comparison. As an example, in response to determining that weighted features associated with a data element of the data 102 fail to satisfy the relevancy threshold, the computing device 110 may discard (e.g., delete) the data element from the memory 120. Alternatively or in addition, in another example, in response to determining that weighted features associated with a data element of the data 102 fail to satisfy the relevancy threshold, the computing device 110 may decrease a duty cycle of a sensor generating the data element or may deactivate the sensor. As a result, resource utilization is improved.

The example of the method 300 of FIG. 3 illustrates that feature importance data can be weighted to improve usefulness of the feature importance data. For example, by weighting features that distinguish the particular data element 108 from the cluster C5 more than features that distinguish the particular data element 108 from the clusters C1, C2, C3, and C4, characteristics of the particular data element 108 can be "localized" to the neighboring environment of the particular data element 108 within a feature space, enabling identification of characteristics of the particular data element 108 contributing to classification of the particular data element 108 as an outlier.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. Thus, the system 100 may be implemented using one or more computer hardware devices (which may be communicably coupled via local and/or wide-area networks) that include one or more processors, where the processor(s) execute software instructions corresponding to the various components of FIG. 1A. Alternatively, one or more of the components of FIG. 1A may be implemented using a hardware device, such as a field-programmable gate array (FPGA) device, an application-specific integrated circuit (ASIC) device, etc. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of general purpose hardware and computer instructions.

Although the disclosure may include a method, it is contemplated that it may be embodied as computer program instructions on a tangible computer-readable medium, such as a magnetic or optical memory or a magnetic or optical disk/disc. All structural and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims, and equivalents thereof.

What is claimed is:

1. A method of operation of a processor, the method comprising:

determining a feature importance ranking for each pair of clusters of a plurality of clusters associated with data to generate a first plurality of feature importance rankings;

determining a feature importance ranking between a particular data element of the data and each cluster of the plurality of clusters to generate a second plurality of feature importance rankings;

determining a distance value associated with each pair of clusters of the plurality of clusters to generate a plurality of distance values, wherein a particular distance value associated with a particular pair of clusters of the plurality of clusters indicates a distance between a first cluster of the particular pair of clusters and a second cluster of the particular pair of clusters;

for each data element of the data at a distance that is within one or more clusters of the plurality of clusters, determining a probability value associated with the data element to generate a plurality of probability values;

weighting the first plurality of feature importance rankings based on the plurality of distance values to determine a first plurality of weighted feature importance rankings;

weighting the second plurality of feature importance rankings based on the plurality of probability values to determine a second plurality of weighted feature importance rankings; and using the first plurality of weighted feature importance rankings and the second plurality of weighted feature importance rankings in a machine learning operation.

2. The method of claim 1, further comprising, prior to determining the first plurality of feature importance rankings:

classifying one or more data elements of the data as being within one or more clusters of the plurality of clusters; and
classifying the particular data element as being an outlier of the data.

3. The method of claim 2, wherein the second plurality of weighted feature importance rankings indicates a weighted ranking of features of the particular data element contributing to classification of the particular data element as an outlier.

4. The method of claim 1, wherein the plurality of clusters is associated with a plurality of sets of features of the data, and wherein the particular data element is associated with a particular set of features that is distinct from each of the plurality of sets of features.

5. The method of claim 1, wherein the first plurality of feature importance rankings and the second plurality of feature importance rankings are generated during an unsupervised learning process performed by the processor.

6. The method of claim 1, wherein the first plurality of feature importance rankings and the second plurality of feature importance rankings are generated during a supervised learning process performed by the processor.

7. The method of claim 1, wherein generating the first plurality of feature importance rankings includes, for a pair of clusters including a first cluster of the plurality of clusters and a second cluster of the plurality of clusters:
identifying at least a first feature associated with classification of data elements of the data as being within the first cluster instead of the second cluster; and
identifying at least a second feature associated with classification of data elements of the data as being within the second cluster instead of the first cluster.

8. The method of claim 1, wherein generating the second plurality of feature importance rankings includes identifying, for each cluster of the plurality of clusters, a feature associated with classification of data elements of the data as being outside each cluster.

9. The method of claim 1, wherein the distance between the first cluster of the particular pair of clusters and the second cluster of the particular pair of clusters is within a feature space.

10. The method of claim 1, wherein generating the plurality of probability values includes determining, for each cluster of the plurality of clusters, a probability that each non-anomalous data element of the data is within the cluster.

11. The method of claim 1, wherein determining the first plurality of weighted feature importance rankings includes identifying a primary feature associated with a clustered data element of the data contributing to classification of the clustered data element within a cluster associated with the clustered data element.

12. The method of claim 1, wherein determining the second plurality of weighted feature importance rankings includes identifying a primary feature associated with the particular data element of the data contributing to classification of the particular data element as being outside a particular cluster that is proximate to the particular data element in a feature space.

13. The method of claim 1, wherein the first plurality of feature importance rankings and the second plurality of feature importance rankings are determined using a random forest classification technique.

14. The method of claim 1, wherein the first plurality of feature importance rankings and the second plurality of feature importance rankings are determined using a mutual information classification technique.

15. An apparatus comprising:
a memory; and
a processor coupled to the memory and configured to:
determine a feature importance ranking for each pair of clusters of a plurality of clusters associated with data to generate a first plurality of feature importance rankings;
determine a feature importance ranking between a particular data element of the data and each cluster of the plurality of clusters to generate a second plurality of feature importance rankings;
determine a distance value associated with each pair of clusters of the plurality of clusters to generate a plurality of distance values, wherein a particular distance value associated with a particular pair of clusters of the plurality of clusters indicates a distance between a first cluster of the particular pair of clusters and a second cluster of the particular pair of clusters;
for each data element of the data that is within one or more clusters of the plurality of clusters, determine a probability value associated with the data element to generate a plurality of probability values;
weight the first plurality of feature importance rankings based on the plurality of distance values to determine a first plurality of weighted feature importance rankings; and
weight the second plurality of feature importance rankings based on the plurality of probability values to determine a second plurality of weighted feature importance rankings.

16. The apparatus of claim 15, wherein the processor is further configured to classify one or more data elements of the data as being within one or more clusters of the plurality of clusters and to classify the particular data element as being an outlier of the data.

17. The apparatus of claim 16, wherein the second plurality of weighted feature importance rankings indicates a weighted ranking of features of the particular data element contributing to classification of the particular data element as an outlier.

18. A non-transitory computer-readable medium storing instructions executable by a processor to perform operations, the operations comprising:
determining a feature importance ranking for each pair of clusters of a plurality of clusters associated with data to generate a first plurality of feature importance rankings;
determining a feature importance ranking between a particular data element of the data and each cluster of the plurality of clusters to generate a second plurality of feature importance rankings;
determining a distance value associated with each pair of clusters of the plurality of clusters to generate a plurality of distance values, wherein a particular distance value associated with a particular pair of clusters of the plurality of clusters indicates a distance between a first cluster of the particular pair of clusters and a second cluster of the particular pair of clusters;
for each data element of the data that is within one or more clusters of the plurality of clusters, determining a probability value associated with the data element to generate a plurality of probability values;
weighting the first plurality of feature importance rankings based on the plurality of distance values to determine a first plurality of weighted feature importance rankings; and weighting the second plurality of feature importance rankings based on the plurality of probability values to determine a second plurality of weighted feature importance rankings.

19. The non-transitory computer-readable medium of claim 18, wherein the operations further comprise, prior to determining the first plurality of feature importance rankings:

classifying one or more data elements of the data as being within one or more clusters of the plurality of clusters; and classifying the particular data element as being an outlier of the data.

20. The non-transitory computer-readable medium of claim 19, wherein the second plurality of weighted feature importance rankings indicates a weighted ranking of features of the particular data element contributing to classification of the particular data element as an outlier.

* * * * *